United States Patent Office 2,987,124
Patented June 6, 1961

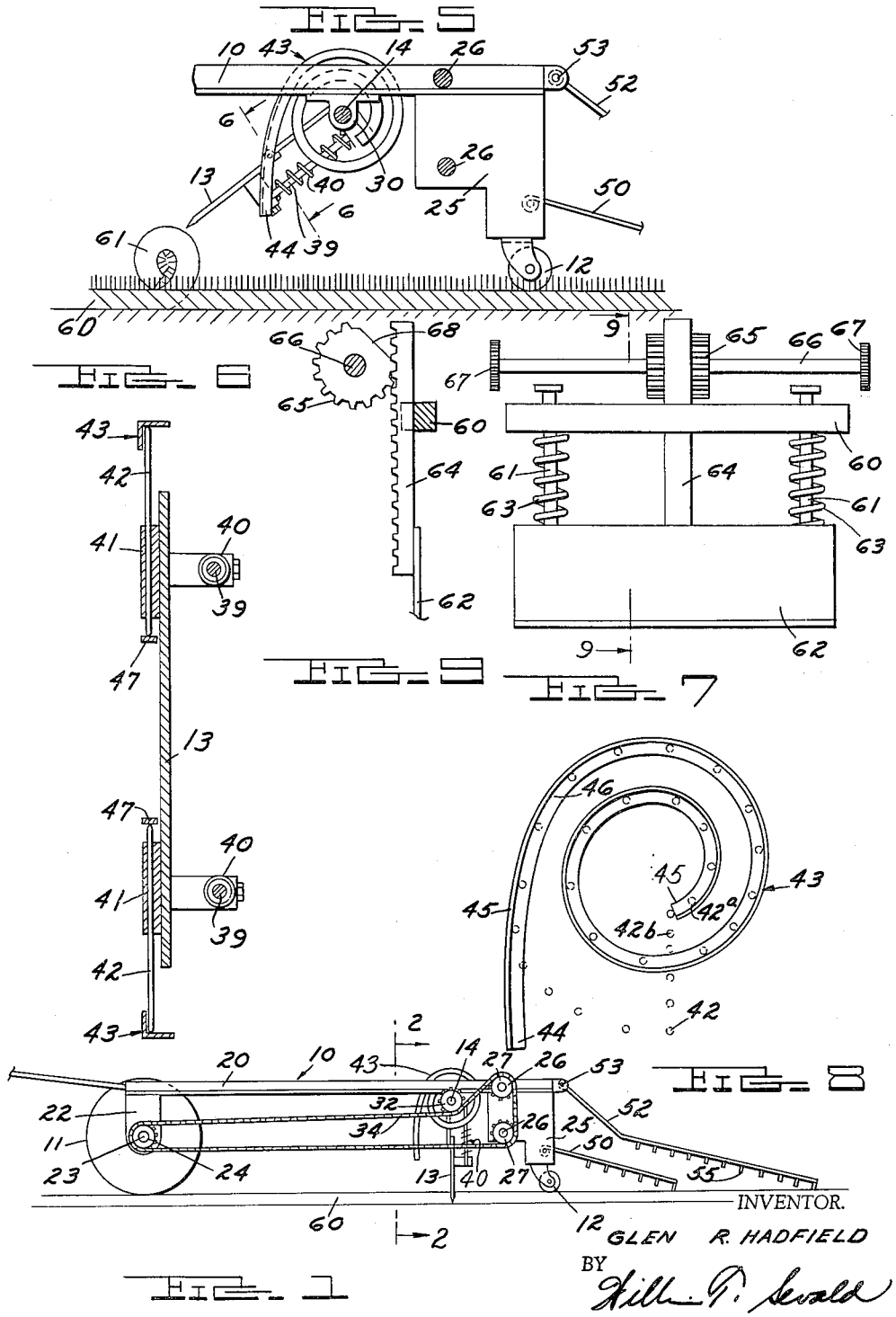

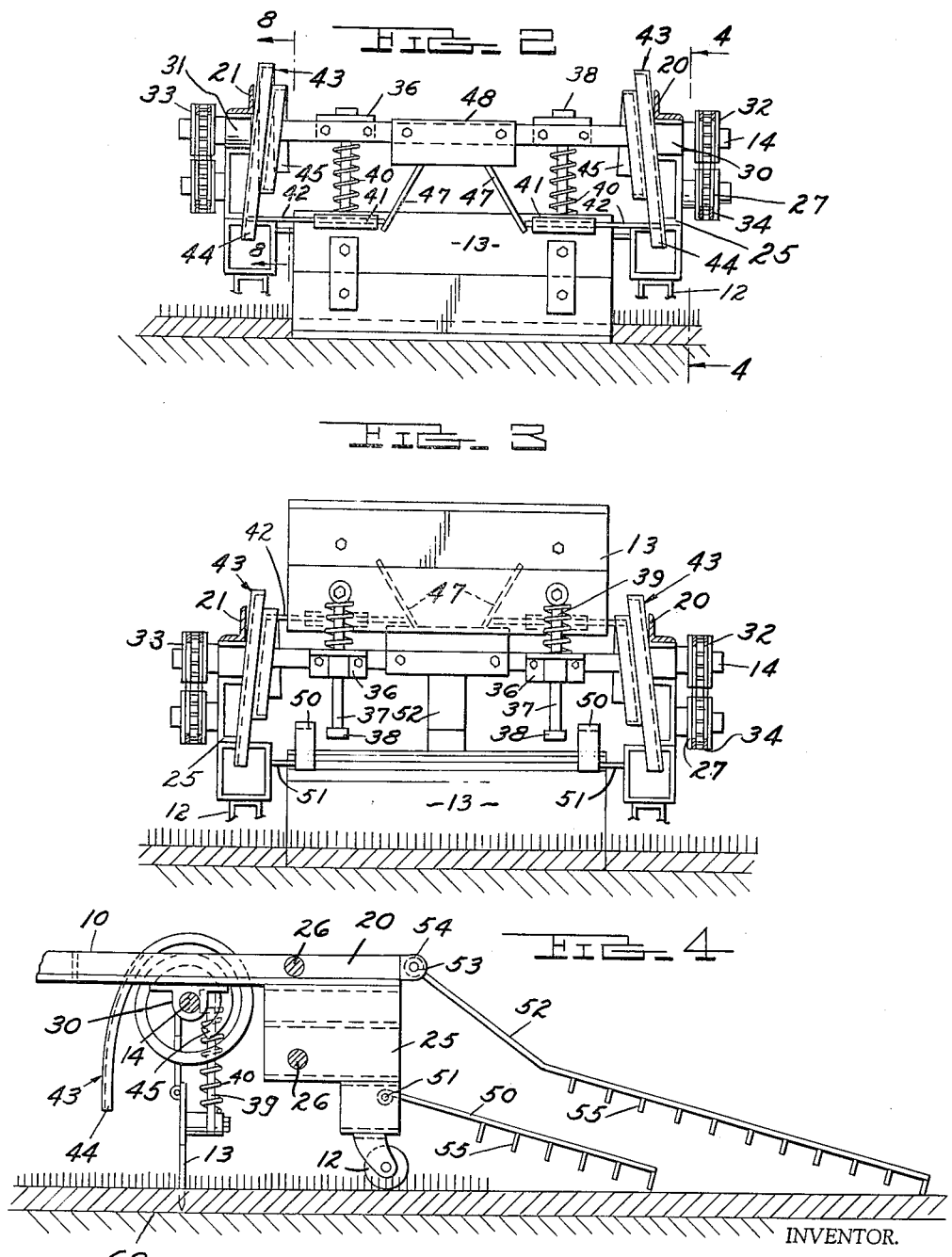

2,987,124
SOD ROLL FORMING APPARATUS
Glen R. Hadfield, 18086 Syracuse St., Detroit 34, Mich.
Filed June 26, 1957, Ser. No. 668,118
5 Claims. (Cl. 172—20)

This invention relates to sod roll forming apparatus and more particularly pertains to a device which severs previously side-cut and under-cut sod strips to length and turns the cut strip lengths into a roll. This application is a continuation-in-part of my co-pending application Serial No. 646,399, filed March 15, 1957, now Patent No. 2,872,989, granted Feb. 10, 1959.

Sod roll forming devices have been employed heretofore to facilitate the commercial harvesting of sod which has previously been side and under-cut, however, the several devices of the prior art have not proven entirely satisfactory inasmuch as they are complicated in design and construction, expensive to manufacture, and unsatisfactory in use.

With the foregoing in view, the primary object of the invention is to provide a sod roll forming apparatus which is simple in design and construction, inexpensive to manufacture, easy to use, easy to maintain, and which forms the sod roll in a satisfactory commercial manner.

An object of the invention is to provide a wheel supported traveling frame, equipped with a rotating knife for severing the sod strip lengths and for kicking the severed sod portion at the blade into the initial roll lap so that trailing sod drags can engage the lapped roll and finish rolling the strip in conjunction with frame forward movement; the frame may be self-propelled or drawn.

An object of the invention is to provide a blade and shaft revolving oppositely to the direction of frame movement for moving the blade against the severed sod strip in the direction of the frame movement so as to kick the sod into an initial lap and to provide spring means at the blade for driving the blade into the sod.

An object of the invention is to provide spiral cams surrounding the shaft co-acting with pins carried by the blade to radially retract the blade so as to load the springs for the next extended sod severing and kicking movement of the blade.

An object of the invention is to provide slide bars adjacent the blade for moving the pins into initial cam contacting position after the blade has severed and kicked the sod strip into the first lap.

An object of the invention is to provide a rack and pinion for raising the blade with the pinion having a flat side for dropping the blade.

These and other objects of the invention will become apparent by reference to the following description of a sod strip severing and rolling device embodying the invention taken in connection with the accompanying drawings in which:

FIG. 1 is a side elevational view of the inventive device.

FIG. 2 is an enlarged cross-sectional view of FIG. 1 taken on the line 2—2 thereof showing the blade, springs, cams, and supporting shaft in more detail with the blade in the extended sod severing condition.

FIG. 3 is a view similar to FIG. 2 showing the blade in the cam retracted spring loaded condition.

FIG. 4 is a cross sectional view of the device seen in FIG. 2 taken on the line 4—4 thereof showing the blade in the sod severing condition.

FIG. 5 is a view similar to FIG. 4 showing the blade in the sod lap forming condition.

FIG. 6 is an enlarged cross-sectional view of the blade portion seen in FIG. 5 taken on the line 6—6 thereof.

FIG. 7 is a front elevational view of a modified device employing a rack and pinion for raising the blade.

FIG. 8 is an enlarged diagramatic view of the spiral cam and pin interaction and operation for retracting and extending the blade; and FIG. 9 is a cross-sectional view of FIG. 7 taken on the line 9—9 thereof showing the pinion having a flat toothless side in detail.

Referring now to the drawings wherein like numerals refer to like and corresponding parts throughout the several views, the sod strip severing and roll forming device disclosed therein to illustrate the invention comprises a frame 10 supported at its forward end by the sod engaging roller 11 and at its rearward end by the wheels 12; the sod strip severing and roll lap kicking blade 13 being mounted on the shaft 14 which is bearinged on the frame 10 and which is driven rotationally opposite to the normal forward movement of the frame 10 to kick the severed sod strip into an initial lap and to move the blade pins 42 into engagement with the spiral cams 43 for retracting the blade 13 from the sod and for loading the spring 40 for subsequently driving the blade into the sod.

More particularly, the frame 10 comprises side members 20 and 21 which carry the roller brackets 22 in which the axle 23 is rotatably bearinged and upon which axle the roller 11 is fixed as well as the chain sprocket gears 24 at either end thereof. The rear brackets 25 ride the rear wheels 12 and support the rear end of the frame members 20 and 21 and also support the paired stub shafts 26 on which the sprocket gears 27 are freely mounted at either side of the frame 10. The paired shaft bearings 30 and 31 are welded on the frame sides 20 and 21 respectively intermediate their length and freely support the shaft 14 journaled therein while the sprocket gears 32 and 33 are fixedly attached to the shaft 14 and are engaged by the paired chains 34 located on either side of the frame 10 which chains are driven by the sprocket gears 24 on the axle 23 and are idled on the sprocket gears 26 so that the chains 34 engage the shaft sprocket gears 32 so as to drive the shaft 14 in a direction counter to the frame movement in a forward direction so that as the frame moves forwardly the rollers 11 and axle 23, and paired sprocket gears 24 drive the chains 34 which drive the shaft 14 via the sprocket gears 32 and 33.

The paired bearings 36 are fixed radially parallel to the shaft 14 and hold and guide the paired slide rods 37 which are equipped with axially adjustable head nut stops 38 for engaging the bearings 36 and extending ends 39 which are fixed to and support the blade 13 radially of the shaft 14; paired springs 40 surround the rod 37 and lie between the bearings 36 and the blade 13 so as to normally urge the blade 13 radially outwardly of the shaft 14.

The paired bearing blocks 41 mounted on the blade 13 house the paired pins 42 which engaged the paired spiral cams 43 which surround the shaft 14 and it is to be noted that the cams 43 spiral both radially inwardly from an initial pin engaging leading portion 44 to a downwardly directed and radially inwardly and axially inwardly drop-off portion 45 so that as the blade 13 rotates with the shaft 14 the pins 42 cause the blade to move radially inwardly towards the shaft to compress the springs 42 in that the circumferential cam portion 45 gradually moves the pins 42 radially inwardly carrying the blade 13 therewith and it is to be also noted that the cam axial portion 46 moves the pins 42 axially inwardly at the same time. The paired bars 47 are disposed between the shaft plate 48 and the blade 13, in sliding relationship with the inward end of the slide pins 42 so as to move the slide pins 42 axially outwardly in conjunction with radial outward movement of the blade 13 under pressure of the springs 40 and it is to be particularly noted that the angle of the slide bars 47 is at a greater inclination than the axial spiral angle of the cams 43 so that in outward movement of the pins 42, the cam engaging end of the pin 42 will by-pass the intermediate convolutions of the cams 43 to a point where the cam engaging ends of the pins 42 are in the plane of the initially engaging portion 44 of the cam 43. In this connection it is to be understood that the force of the engagement with both spiral cam portions 45 and 46 of the cams 43 with the pins 42 is such and directionally co-ordinated that it is not necessary for the slide bars 47 to engage the inward end of the pins 42 at the plate as the cams 43 hold the pin 42 in forced engagement therewith once engagement is made by the slide bars 47 adjacent the blade 13.

The paired trailing sod turning drags 50 are hingedly attached as at 51 to the rear bracket 25 at either side of the frame 10 and extend rearwardly therefrom so as to engage the sod roll in its first lapped 61 condition and to turn the sod roll in conjunction with forward movement of the frame 10 and the center sod engaging trailing drag 52 is hingedly mounted as at 53 to the frame rear cross member 54 so as to engage a sod roll partially formed by the drags 15 in conjunction with forward movement of the frame 10 and to complete the turning of the sod roll; the trailing drags 50 and 52 are equipped with flat teeth 55 which are adapted to engage the sod roll without breaking the root mesh so as to provide turning engagement.

In operation, the device is positioned over a sod strip 60 as seen in FIGS. 1, 2, and 4 and the frame 10 moved forwardly until the slide pins 42 move off the cam 43 drop-off portion 45 whereupon the compressed springs 40 drive the blade 13 into the sod strip to sever the strip and as the frame 10 is travelling to the left as seen in FIGS. 1 and 4, the blade 13 in its extended condition is also travelling arcuately in the same direction whereby the blade 13 exerts a forward and upward force against the severed edge of the sod strip 60 to kick the sod into the initial lap 61 condition seen in FIG. 5 as the blade 13 has moved lineally and rotationally from the position seen in FIGS. 1 and 4 to position seen in FIG. 5 in conjunction with forward movement of the frame 10. After the blade 13 has passed the sod lap 61, the frame 10 rides over the sod lap 61 and the side drags 50 engage the sod lap 61 as seen in FIG. 3 and turn the sod lap 61 to the roll condition 62 of FIG. 3 whereupon the center drag 52 engages the sod roll 62 and continues to turn the sod roll 62 until the sod roll is completely formed.

After the blade 13 has been driven into the sod strip 60, and moved forward to kick the sod lap 61 into position for the drags, slide pins 42 are in their axial outward positions seen in FIGS. 2 and 5 so that upon rotation of the blade 13 the extended ends of the pins 42 engage the spiral cams 43 at their initial pin engaging portions 44 and the spiral cams 43 then move the pins radially inwardly in conjunction with the continued rotation of the blade 13 to the point seen in FIG. 3 whereupon the springs 40 are compressed and it is to be further noted that the pins 42 are moved axially inwardly at the same time so that they lie axially inwardly of the intermediate convolutions of the spiral cams 43 and upon the pins 42, FIG. 8, riding off the drop-off portion 45 of the cams 43 the pin position of 42A is no longer held by the cam 43 so that with the pins in the 42B position, the springs 40 project the blade 13 radially outwardly and downwardly toward the sod strip 60 to again sever the sod strip and to then kick the sod lap 61 into position as hereinbefore previously described whereupon the slide pins 42 again contact the spiral cams 43 and the operation is repeated and it is to be understood that the toothed drags 50 and 52 complete their sod turning operation while the slide pins 42 revolve about the spiral cams 43 and that the gearing, length of the cams 43, and travel of the frame 10 are co-ordinated to produce strips in a rolled condition of the desired length.

Referring now to the device of FIGS. 7 and 9, the beam 60 slidably supports the slide rods 61 which in turn support the blade 62 with the springs 63 disposed between the blade 62 and beam 60 urging the blade 62 downwardly. The blade 62 supports the rack 64 which meshes with the pinion 65 on the shaft 66 which is equipped with sprocket gears 67 at either end for driving engagement with the chains 34 and it is to be particularly noted that the pinion 65 has a flat toothless side 68 for by-passing the rack teeth to permit the springs 63 to drive the blade 62 downwardly to cut a strip of sod to length.

In operation of the device of FIGS. 7 and 9, the frame is propelled forwardly and the chains travelled over the sprocket gears 67 so as to rotate the shaft 66 and pinion gear 65 upwardly on the side adjacent the rack 64 so that the pinion teeth meshing with the rack 64 move the rack 64 upwardly so as to elevate the blade 62 and compress the springs 63 until the pinion flat side 68 faces the rack whereupon the rack by-passes the pinion and the springs 63 drive the blade 62 into the rod to sever the strip.

After the blade 62 has cut the sod strip, the frame moves the blade 62 forwardly in its down position so that the blade plows the sod causing it to lap over and as the blade 62 moves forward it is elevated by the pinion 65 being rotated to engage its teeth with the rack 64 to again raise the blade 62 and the upward movement of the blade 62 assists in turning over the severed rod strip into an initial lap for the trailing drags to engage and turn into a roll.

The inventive sod turning and roll forming device constitutes a compact, durable, neat appearing, and easily operated device to sever and turn sod strips into rolls with commercial efficiency and obviates much labor, time, and expense.

Although but a single embodiment of the invention has been shown and described in detail with one modification, it is obvious that many changes can be made in the size, shape, detail, and arrangement of the various elements of the invention within the scope of the appended claims.

I claim:

1. Apparatus for cutting sod to length and turning sod into rolls from previously side-cut and under-cut sod strips comprising a frame having rear wheels and a front axle having a ground contacting roller fixed thereon and chain sprocket gears fixed thereto at either end thereof for driving a sod cutting and sod roll starting blade, a shaft journalled transversely of said frame having chain sprocket gears fixed thereto at either end thereof, paired chains engaging said gears on said axle and shaft to drive said shaft, slide rods tangentially journalled on said shaft having shaft engaging heads for limiting radially outward sliding movement of said rods relative to said shaft and extending ends, a blade fixed on said extending ends, springs disposed between said shaft and said blade surrounding said rods normally urging said blade outwardly from said shaft, paired spiral cams fixed on said frame surrounding said shaft; said cams spiralling both radially inwardly and axially inwardly; paired bearing blocks on said blade paralleling said shaft, slide pins in said bearing blocks paralleling said shaft normally engaging said paired spiral cams, and cam bars angularly radially disposed between said shaft and said blade for initially extending said pins into engagement with said spiral cams; each said paired spiral cam having a pin-end engaging radially extending portion and a pin side engaging axially extending portion for moving said pin axially and radially inwardly at the same time; said blade being adapted to be moved inwardly by said cams and pins to load said springs until said pins move off said cams whereupon said springs drive said blade into the sod strip below to sever same as to length whereupon said blade first kicks the sod into the first lap of a roll and then engages said pins with said cams to again load said springs.

2. Apparatus for cutting sod to length and turning sod into rolls from previously side-cut and under-cut sod strips comprising a frame having a front axle having a ground contacting roller fixed thereon and chain sprocket gears fixed thereto at either end thereof for driving the sod cutting and sod roll starting blade, a shaft journalled transversely of said frame having chain sprocket gears fixed thereto at either end thereof, paired chains engaging said sprocket gears on either side of said frame to drive said shaft, slide rods transversely journalled on said shaft having extending ends, a blade fixed on said extending ends, springs disposed between said shaft and said blade normally urging said blade outwardly from said shaft, paired spiral cams fixed on said frame surrounding said shaft; said cams spiralling both radially inwardly and axially inwardly, slide pins on said blade paralleling said shaft normally engaging said paired spiral cams, and means disposed between said shaft and said blade for initially extending said pins into engagement with said spiral cams; said paired spiral cams having pin-end engaging radially extending portions and pin side engaging axially extending portions for moving said pins axially and radially inwardly at the same time; said blade being adapted to be moved radially inwardly by said cams and pins to load said springs until said pins move off said cams whereupon said springs drive said blade into the sod strip below to sever same as to length whereupon said blade first kicks the sod into the first lap of a roll and then engages said pins with said cams to again load said springs.

3. Apparatus for cutting sod to length and turning sod into rolls from previously side-cut and under-cut sod strips comprising a travelling frame, a shaft journalled transversely of said frame, means for driving said shaft, slide rods journalled on said shaft transversely thereto, a blade fixed on said rods, a spring normally urging said blade radially outwardly from said shaft, a spiral cam fixed on said frame surrounding said shaft; said cam spiralling radially inwardly, a slide pin on said blade, means for projecting said pin into engagement with said cam; said blade being adapted to be moved radially inwardly by said cam and pin to load said spring until said pin moves off said cam whereupon said spring drives said blade into the sod strip below to sever same as to length whereupon said blade first kicks the sod into the first lap of a roll and then engages said pin with said cam to again load said spring; said means for driving said shaft comprising a sprocket gear on said shaft and a driven chain driving said gear.

4. Apparatus for cutting sod to length and turning sod into rolls from previously side-cut and under-cut sod strips comprising a travelling frame, a shaft journalled transversely of said frame having means associated therewith to drive said shaft, transverse slide rods journalled on said shaft having extending ends, a blade fixed on said extending ends, springs disposed between said shaft and said blade normally urging said blade outwardly from said shaft, paired spiral cams fixed on said frame surrounding said shaft; said cams spiralling radially inwardly, slide pins on said blade normally engaging said paired spiral cams, and means for intially extending said pins into engagement with said spiral cams; said blade being adapted to be moved inwardly by said cams and pins to load said springs until said pins move off said cams whereupon said springs drive said blade into the sod strip below to sever same as to length whereupon said blade first kicks the sod into the first lap of a roll and then engages said pins with said cams to again load said springs.

5. A machine for cutting sod to length and turning sod into rolls from previously side-cut and under-cut sod strips comprising a frame having opposite ends, wheels supporting one end of said frame, an axle journalled on said frame at the other end thereof, a ground contacting roller fixed on said axle adapted to rotate in conjunction with forward movement of said frame, at least one sprocket gear on said axle, a shaft journalled on said frame paralleling said axle, at least one sprocket gear fixed on said shaft, a chain disposed between said sprocket gear on said axle and said sprocket gear on said shaft, means associated with said chain and sprocket gears adapted to drive said shaft in a rotational direction reverse to said shaft and roller rotational direction, slide rods transversely journalled on said shaft; said slide rods having extending ends; a blade fixed on said extending ends; said slide rods and blade rotating with said shaft; springs disposed between said shaft and said blade urging said slide rods and blade outwardly from said shaft; means on said rods limiting outward movement; oppositely disposed spiral cams fixed on said frame surrounding said shaft each having a radially inner end axially adjacent to said blade terminating downwardly toward a sod strip constituting a slide pin drop-off portion and a radially outer end axially remote from said blade terminating downwardly toward a sod strip constituting a slide pin pick-up portion; slide pins journalled on said blade lying parallel to said shaft having extending ends normally engaging said spiral cams; said blade being adapted to be moved inwardly by said cams and pins to load said springs until said pins move off said cams whereupon said springs drive said blade into the sod strip below to sever same as to length whereupon said blade first kicks the sod into the first lap of a roll and then engages said pins with said cams to again load said springs.

References Cited in the file of this patent

UNITED STATES PATENTS

| | | |
|---|---|---|
| 13,505 | Bowerman | Aug. 28, 1855 |
| 90,994 | Clareton | Jan. 8, 1869 |
| 2,164,246 | Kirkpatrick | June 27, 1939 |
| 2,345,425 | Phillips | Mar. 28, 1944 |
| 2,760,425 | Day | Aug. 28, 1956 |
| 2,778,292 | Kavan | Jan. 22, 1957 |
| 2,872,989 | Hadfield | Feb. 10, 1959 |